Figure 1:
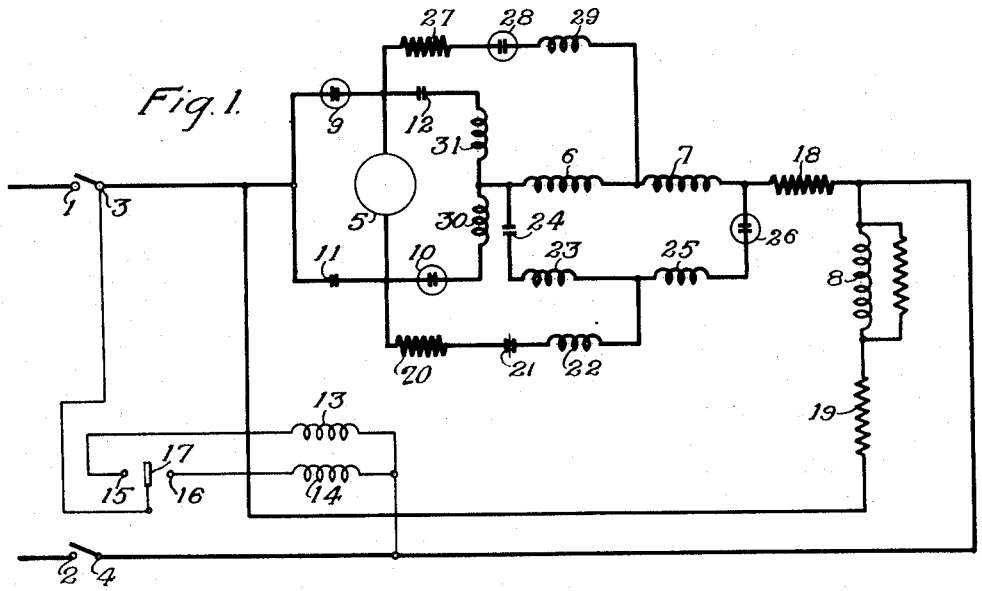

Nov. 27, 1923.

S. GOWAN ET AL 1,475,766

ELECTRICALLY DRIVEN PLANER AND THE LIKE

Filed Sept. 8, 1920  3 Sheets-Sheet 1

WITNESSES:
J. A. Helsel
W. R. Coley

INVENTORS
Sydney Gowan &
Leonard Miller
BY
Wesley G. Carr
ATTORNEY

Nov. 27, 1923.     1,475,766
S. GOWAN ET AL
ELECTRICALLY DRIVEN PLANER AND THE LIKE
Filed Sept. 8, 1920     3 Sheets-Sheet 2

WITNESSES:
J. A. Helsel
W. R. Coley

INVENTORS
Sydney Gowan &
Leonard Miller
BY
Wesley L. Barr
ATTORNEY

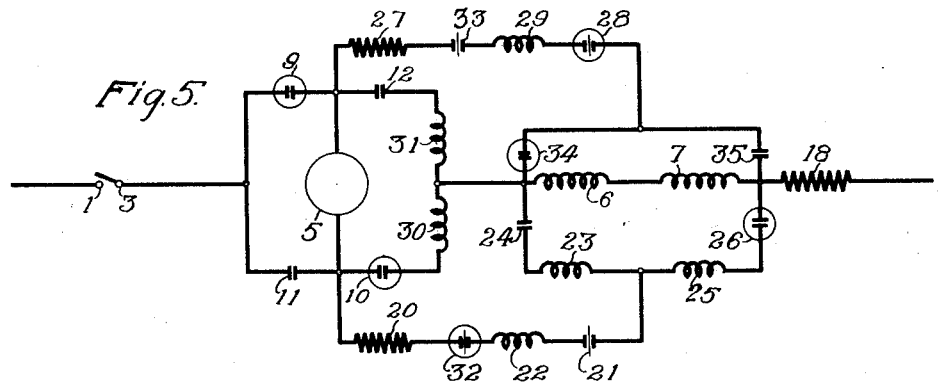
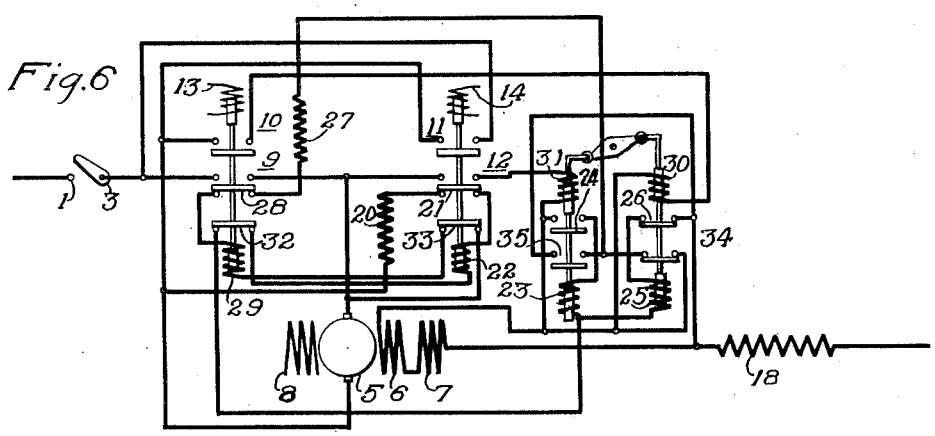

Patented Nov. 27, 1923.

1,475,766

UNITED STATES PATENT OFFICE.

SYDNEY GOWAN, OF SALE, AND LEONARD MILLER, OF WHITEFIELD, ENGLAND, ASSIGNORS TO WESTINGHOUSE ELECTRIC & MANUFACTURING COMPANY, A CORPORATION OF PENNSYLVANIA.

ELECTRICALLY-DRIVEN PLANER AND THE LIKE.

Application filed September 8, 1920. Serial No. 408,807.

*To all whom it may concern:*

Be it known that we, SYDNEY GOWAN, a subject of the King of Great Britain, and a resident of Sale, in the county of Chester, England, and LEONARD MILLER, a subject of the King of Great Britain, and a resident of Whitefield, in the county of Lancaster, England, have invented a new and useful Improvement in Electrically-Driven Planers and the like, of which the following is a specification.

Our invention relates to electrically driven planers and like machines, in which a table or other member is reciprocated by means of an electric motor which is reversed at the end of each stroke by a master switch that is automatically actuated by the operation of the machine. A well-known method of controlling such motors is by means of contactor switches that are operated or governed by coils that are included in a control circuit, the circuits being made and broken through the various operating coils by means of the master switch, or by starting and stopping buttons or switches, or by inching buttons for moving the reciprocating member a short distance in the one or the other direction.

One object of the present invention is to provide means whereby a dynamic-braking circuit may be connected to the motor armature when the supply of current to the motor is interrupted, either during the intervals between the cut and the return strokes before the reversal of the direction of rotation, or by failure of voltage, or during the inching operation, or by reason of an emergency stop.

More specifically stated, the object of our invention is to provide a brake circuit for reversing planer motors, and the like, which includes only a selected part of the series field winding, through which braking current flows in the same direction as the previous accelerating current.

According to our invention the motor, the direction of rotation of which is reversed by reversing the armature connections, is provided with a series field winding to which the armature terminals are connected through special braking circuits. These braking circuits are provided with resistors and with contractor switches, the operating coils of which are included in the armature circuit in such a manner that a dynamic braking current supplied by the armature when rotating by its own momentum, the supply of current thereto from an external source having been interrupted, shall tend to magnetize the motor fields in the same direction as the current which was supplied to the motor from the external source.

In order that our invention may be clearly understood, some methods of carrying out the same in practice will now be described.

Figure 2:
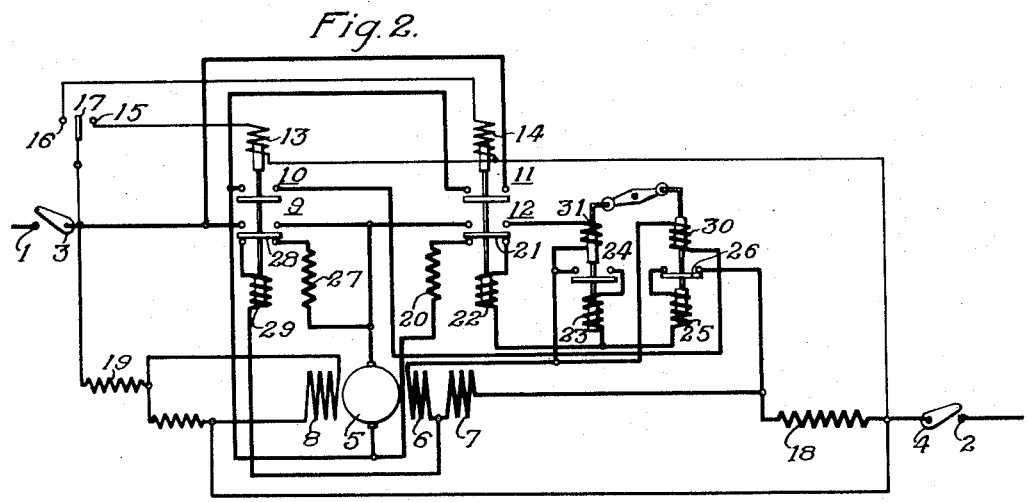
Figure 3:
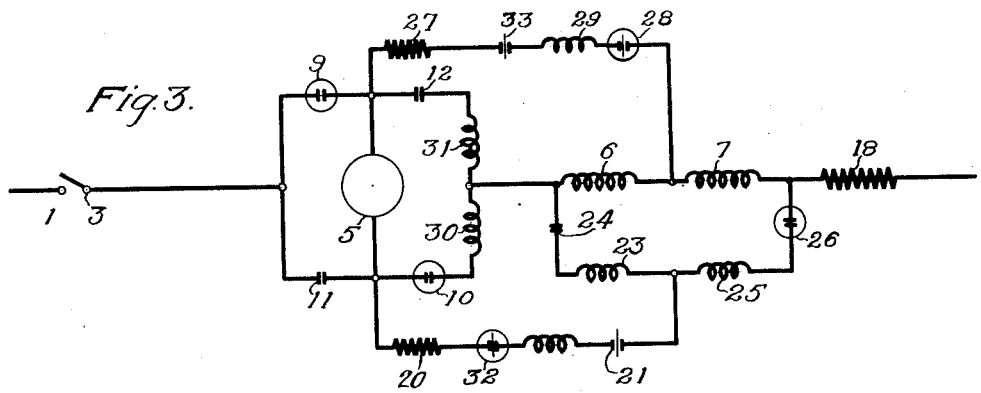
Figure 4:
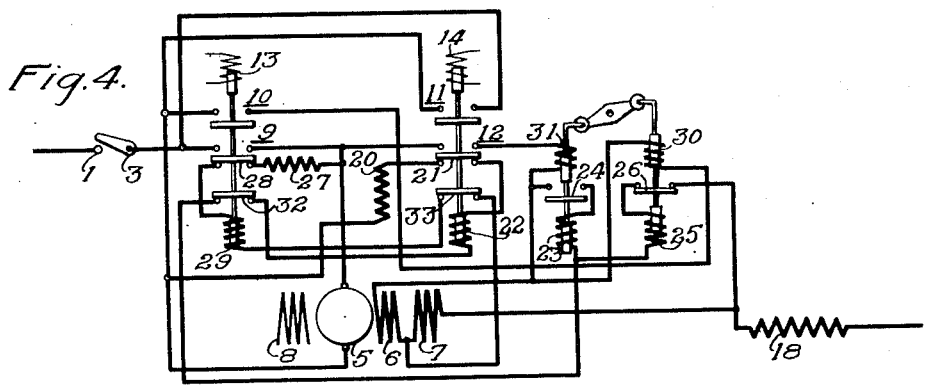

In the accompanying drawings, Fig. 2 is a diagrammatic view of the circuits of an electric motor for driving a planing machine and provided with a brake circuit in accordance with our present invention. Figs. 4 and 6 are similar diagrams showing modified arrangements. Figs. 1, 3 and 5 are simplified views respectively corresponding to Figs. 2, 4 and 6.

In all the figures a source of supply is indicated by line conductors 1 and 2, which are provided with main switches 3 and 4. The motor to be controlled comprises an armature 5, a series field-magnet winding having two portions or sections 6 and 7, and a shunt field-magnet winding 8. Reversing switches 9, 10, 11 and 12 are provided, the switches 9 and 10 being closed when the armature is to be rotated during the cutting stroke of the machine, while the switches 11 and 12 are closed when the armature is reversed and the motor is causing the return stroke of the machine. These four switches may be of the ordinary contactor type, the switches 9 and 10 being operated by means of a coil 13, and the switches 11 and 12 being operated by a coil 14.

The operating coils 13 and 14 have a common terminal connected to the supply lead 2 and their other terminals are respectively connected to fixed contact members 15 and 16, either one of which may be connected by a switch member 17, which is adapted to be actuated by the planer table, to the supply conductor 1. An accelerating resistor 18 is connected in series with the field-winding portions 6 and 7, while a resistor 19 is connected in series with the shunt field winding 8, but neither of these resistors form any part of the present invention and they will not, therefore, be further described.

Referring now to Fig. 2, the braking circuit starting from one terminal of the armature 5, traverses a braking resistor 20; a switch 21, which is always closed when the contactors 11 and 12 are open and opened when these contactors are closed, said switch being what is commonly termed a back contact switch; and operating coil 22, which is adapted to act in opposition to the coil 14 to hold the switch 21 closed. The circuit then divides, one branch being connected through an operating coil 23, the function of which is described below, and a switch 24 to one end of the series field-winding section 6, and the other branch passing through an operating coil 25 and a switch 26 to the outer end of the series field-winding section 7.

From the other terminal of the armature the braking circuit is led through the braking resistor 27, a back contact switch 28, which is always closed when the contactors 9 and 10 are open and is opened when these contactors are closed, an operating coil 29, which is arranged to act in opposition to the operating coil 13 of the contactors 9 and 10, and thence to the middle point of the series field winding, that is to say to the common terminal of the parts 6 and 7 of said winding. Included between the contactor 10 and the series field winding 6 is an operating coil 30 which, when energized, closes the switch 26, and between the contactor 12 and the series field winding 6 is an operating coil 31 which, when energized, closes the switch 24. The operating coil 23, when energized, acts as a holding coil to maintain the switch 24 closed, and the operating coil 25 performs the same function for the switch 26. The switches 24 and 26 are interlocked in a familiar manner whereby the closure of either switch causes the opening of the other switch and when once either switch has been closed it remains closed until it is opened by the initial movement of the other switch in closing.

The operation of the system is as follows: The switches 3 and 4 being closed, the shunt field winding 8 is energized and the switch 17 may then be manually or otherwise operated to close the circuit through the actuating coil 13. This action closes the contactors 9 and 10, whereupon a main circuit is established from supply conductor 1 through contactor 9, motor armature 5, contactor 10, operating coil 30, both series field-winding sections 6 and 7 and resistor 18 to the other supply conductor 2. The motor then rotates in a direction to cause the cutting stroke of the machine. The coil 30, being energized, closes the switch 26 and the contactors 11 and 12 being open, the switch 21 will be closed; but as the contactors 9 and 10 are closed, the switch 28 will be open, so that no current flows in the brake circuit. Series field-winding sections 6 and 7 will be shunted by a circuit through braking resistor 20, switch 21, operating coil 22, operating coil 25 and switch 26, but as the resistance value of the resistor 20 is high, the current through the series field windings will not be detrimentally reduced.

At the end of the cutting stroke of the machine, the switch 17 is automatically operated by a tappet on the planer table, for example, so as to break connections with the contact member 15 and make connection with the contact member 16. The operating coil 13 is thereby deenergized, while the operating coil 14 is energized. The contactors 9 and 10 are thus opened, and the back contact switch 28 is closed. A braking circuit is, therefore, established from the armature 5, through braking resistor 27, back contact switch 28, operating coil 29 the part 7 of the series field winding, switch 26, operating coil 25, operating coil 22, back contact switch 21, and braking resistor 20 to the armature again.

It will be observed that the current passes through the series field winding 7 in the same direction as it did when the motor was being supplied with current; consequently, the magnetization of the motor field magnet is not reversed during the braking operation. The back contact switch 21 remains closed because, although the operating coil 14 is energized, the predominating coil 22 is energized by the braking current and prevents the closure of the switches 11 and 12 until the braking current has fallen to a predetermined low value. When this current value is reached, the contactors 11 and 12 are closed, the back contact switch 21 is opened, thereby opening the brake circuit. The motor circuit is then established from the line conductor 1 through contactor 11, armature 5, contactor 12, operating coil 31, series field-winding sections 6 and 7, and resistor 18 to conductor 2.

The armature terminals having been reversed, the motor rotates in a reverse direction and causes the machine to perform its return stroke. The operating coil 31 being energized, switch 24 is closed and this action causes the opening of the switch 26, and the contactors 9 and 10 being opened, the back contact switch 28 will be closed. The part 6 of the series field winding will be shunted by a circuit through braking resistor 27, back contact switch 28 and operating coil 29, but the resistance value of the resistor 27 is so large that the current through the series field winding will not be detrimentally reduced.

At the end of the return stroke, the switch 17 is again operated to break connection with the contact member 16 and to make connection with the contact member 15. The coil 13 is thereby energized and the coil 14 is de-energized. The contactors 11 and 12 are thus opened and back contact 21 is, therefore, closed. A braking circuit will thereby be established from the armature 5 through the braking resistor 20, back contact switch 21, operating coil 22, operating coil 23, switch 24, series field-winding section 6, operating coil 29, back contact switch 28 and braking resistor 27 to the armature again. Although the operating coil 13 is energized, closure of the contactors 9 and 10 will be prevented by reason of the energization of the coil 29, until the braking current has fallen to the predetermined limit, whereupon the contactors 9 and 10 are closed and the back contact switch 28 is opened, thus opening the brake circuit. It will be observed that the flow of current through the field-winding section 6 is in the same direction as it was during the accelerating operation of the motor. The contactors 9 and 10 having closed, current is supplied from the line conductors 1 and 2 to the armature 5 in the reverse direction, and the motor rotates so as to cause the machine to perform its cutting stroke again.

In the arrangement just described, during the period when current is supplied to the armature from the line conductors 1 and 2 either the whole or one half of the series field-magnet winding is shunted by the one or the other branch of the brake circuit but as previously stated no detrimental effect will usually be caused. In order, however, to entirely avoid this shunting of the field winding, the brake circuits may be provided with additional switches, as shown in Fig. 4, in which, in the branch containing the back contact switch 21, a switch or contactor 32 is provided. The contactor 32 is opened by the closure of the switches 9 and 10, through which current is supplied to the armature 5 when the machine is performing its cutting stroke. In the other branch of the circuit, namely, that containing the back contact switch 28, a switch or contactor 33 is provided which is closed when the switches 11 and 12 are opened. It will be observed that the switches 28 and 32 are both closed when the switches 9 and 10 are opened and are opened when these switches are closed. They are, therefore, both back contact switches.

In a similar way switches 21 and 33 are both back contact switches, being closed when the switches 11 and 12 are opened and opened when these two switches are closed. The effect of this arrangement is that when the switches 9 and 10 are closed, the switch 32 will be opened and consequently the shunt circuit around the series field-winding sections 6 and 7 will be opened. In the same way, when the switches 11 and 12 are closed, the switch 33 and the shunt circuit around the portion 6 of the series field winding will be open. Consequently, in neither case will the field winding be shunted when the motor is being supplied with current from the supply conductors.

In the arrangements shown in Figs. 2 and 4, the braking current passes through one-half only of the series field magnet winding. If, however, it is desired to use the whole of the series field winding during the braking period, the arrangement of circuits shown in Fig. 6 may be employed. In this arrangement, the brake circuit in the lower portion of the diagram is identical with that shown in the lower portion of the diagram, Fig. 4. The connections of the brake circuit in the upper portion of the diagram are similar, that is to say the portion of the brake circuit containing the coil 29 and the back contact switch 28 is divided, one branch being connected through a switch 34 to one terminal of the series field winding and the other branch being connected through a switch 35 to the outer terminal of the field-winding section 7. It will be observed that the series field-winding sections 6 and 7 in effect form a single coil. The switch 34 is similar to the switch 25 and is closed when the switches 9 and 10 are open. The switch 35 is similar to the switch 29 and is closed when the switches 11 and 12 are open.

It will be readily seen, therefore, that since the switches 34 and 26 are closed at the same time, that is to say, when the switches 35 and 24 are open, and since the latter switches 35 and 24 are closed when the switches 34 and 26 are open, it follows that whenever the brake circuit is closed upon the opening of switches 9 and 10, the current from the motor armature will circulate through the braking resistor 27 and the upper portion of the brake circuit, then through the switch 34, field-winding sections 6 and 7, switch 26, and the lower portion of the brake circuit; whereas when the switches 11 and 12 are opened near the end of the return stroke of the machine the brake current will circulate through the resistor 20 and the lower portion of the brake circuit, then through the switch 24, field-winding sections 6 and 7, switch 35, and the upper portion of the brake circuit.

Thus the brake current will circulate in the same direction in the series field windings during the braking periods, as the accelerating current does at the time that current is supplied to the motor from an external source. The switches 32 and 33 will prevent any shunting of the field winding during the period that current is being supplied to the motor in the same manner as previously described with reference to Fig. 2 of the drawings.

It will be understood that the electrical diagrams are not complete, inasmuch as additional circuits will usually be provided for cutting in and out the accelerating resistor 18 and portions of the shunt field winding resistor 19, and also for performing the operation known as inching and for other purposes in connection with the driving of the machine; but as such arrangements are well known, it is not deemed necessary to describe them. The diagrams, Figs. 2 and 3, only show so much of the motor circuits as is necessary to understand the connections of the brake circuit.

We do not wish to be restricted to the specific circuit connections or arrangement of parts herein set forth, as further modifications thereof may be made without departing from the spirit and scope of our invention. We desire, therefore, that only such limitations shall be imposed as are indicated in the appended claims.

We claim as our invention:

1. The combination with a dynamo-electric machine having a plural-part field winding, of means for reversing said machine, means for connecting the entire field winding in circuit during acceleration, and means for establishing a brake circuit during the intervals between reversals of said machine, said circuit including only one part of said field winding, the braking current flowing through said field-winding part in the same direction as the accelerating current.

2. The combination with a reversible planer motor or the like having a plural-part series field winding, of means for connecting the entire field winding in circuit during acceleration, and means for establishing a brake circuit during the intervals between reversals of said motor, said circuit including only one part of said series field winding and being arranged to cause the traversal of current through said field-winding part in the same direction as the accelerating current.

3. The combination with an electric motor having a two-part torque-producing field winding, of means for connecting the entire field winding in circuit during running conditions, and means including only one part of said field winding for establishing a dynamic braking circuit, the energization of said field-winding part being in the same direction under all conditions.

4. The combination with a dynamo-electric machine having a sub-divided field winding and adapted for both accelerating and braking operation, of means for connecting the entire field winding in circuit during one type of operation, and means including only one part of said field winding for effecting the other type of operation and for causing the current to traverse said field-winding part in the same direction as during the first type of operation.

5. The combination with a dynamo-electric machine having a field winding, of means for establishing a braking circuit for said machine having two branches connected through said field winding, one branch being divided and connected to the terminals of said winding and the other branch being connected to an intermediate point of said field winding.

6. The combination with a dynamo-electric machine having a series field winding comprising two equal parts, of means for establishing a braking circuit for said machine having two branches connected through said field winding, one branch being divided and connected to the terminals of said winding and the other branch being connected to the junction-point of said field-winding parts.

7. The combination with a dynamo-electric machine having a field winding, of means for establishing a brake circuit for said machine having a branch divided and connected to the terminals of said field winding, and means responsive to certain machine operation for closing a gap in one division of said branch.

8. The combination with a dynamo-electric machine having a field winding, of means for establishing a brake circuit for said machine having a branch divided and connected to the terminals of said field winding, means responsive to certain machine operation for closing a gap in one division of said branch, and means independent of said responsive means for maintaining the closure of said gap during braking operation.

9. The combination with a dynamo-electric machine having a field winding, of means for establishing a brake circuit for said machine having a branch divided and connected to the terminals of said field winding, a coil in the machine accelerating circuit for closing a gap in one division of said branch, and a holding coil in said division for maintaining such closure during braking operation.

10. The combination with a dynamo-electric machine having a field winding, of means for reversing said machine, means for establishing a brake circuit for said machine having two branches respectively divided and connected to the terminals of, and connected to an intermediate point of said field winding, and means responsive to forward and to reverse machine operation, respectively, for closing gaps in the one or the other division of said branch.

11. The combination with a dynamo-electric machine having a field winding, of means for reversing said machine, means for establishing a brake circuit for said machine having two branches respectively divided and connected to the terminals of, and connected to an intermediate point of said field winding, means responsive to forward and to reverse machine operation, respectively, for closing gaps in the one or the other division of said branch, and means independent of said responsive means for maintaining the closure of the one or the other gap during braking operation.

12. The combination with a dynamo-electric machine having a field winding, of means for reversing said machine, means for establishing a brake circuit for said machine having two branches respectively divided and connected to the terminals of, and connected to an intermediate point of said field winding, a plurality of coils respectively connected in the forward and in the reverse accelerating circuits for closing gaps in the one or the other division of said branch, and a plurality of holding coils in said divisions for maintaining the closure of the one or the other gap during braking operation.

13. The combination with a dynamo-electric machine having a field winding, of means for establishing a brake circuit for said machine having two branches connected to said field winding, means for reversing said machine, and means responsive to both forward and reverse machine operation for controlling the closure of gaps in said branches.

14. The combination with a dynamo-electric machine having a field winding, of means for establishing a brake circuit for said machine having two branches respectively divided and connected to the terminals of, and connected to an intermediate point of said field winding, means responsive to forward and to reverse machine operation, respectively, for closing gaps in the one or the other division of said branch, and means responsive to both forward and reverse machine operation for ensuring the opening of each branch during accelerating operation.

15. The combination with a dynamo-electric machine having a field winding, of means for establishing a brake circuit for said machine having two branches respectively divided and connected to the terminals of, and connected to an intermediate point of said field winding, means responsive to forward and to reverse machine operation, respectively, for closing gaps in the one or the other division of said branch, means responsive to both forward and reverse machine operation for ensuring the opening of each branch during accelerating operation, and means independent of said responsive means for maintaining the closure of the one or the other gap during braking operation.

16. The combination with a dynamo-electric machine having a field winding, of means for reversing said machine, means for establishing a brake circuit for said machine having two branches respectively divided and connected to the terminals of, and connected to an intermediate point of said field winding, a plurality of coils respectively connected in the forward and in the reverse accelerating circuits for closing gaps in the one or the other division of said branch, switching means corresponding to both forward and reverse acceleration for ensuring the opening of each branch, and a plurality of holding coils in said divisions for maintaining the closure of the one or the other gap during braking operation.

In testimony whereof, I, SYDNEY GOWAN, have hereunto subscribed my name this 12th day of August, 1920.

SYDNEY GOWAN.

In testimony whereof, I, LEONARD MILLER, have hereunto subscribed my name this 12th day of August, 1920.

LEONARD MILLER.